June 14, 1960 H. W. COOKSON, JR., ET AL 2,940,520
GRILLE
Filed Feb. 3, 1958 2 Sheets-Sheet 1

INVENTOR.
Harold W. Cookson, Jr.
Russell Wardlaw
BY
Attorneys

INVENTOR.
Harold W. Cookson, Jr.
Russell Wardlaw
BY
Attorneys

United States Patent Office 2,940,520
Patented June 14, 1960

2,940,520

GRILLE

Harold W. Cookson, Jr., San Francisco, and Russell Wardlaw, Mill Valley, Calif., assignors to The Cookson Company, San Francisco, Calif., a corporation of California Filed Feb. 3, 1958, Ser. No. 712,724

1 Claim. (Cl. 160—229)

This invention relates generally to grilles and more particularly to rolling grilles.

Grilles heretofore provided have often been difficult to operate. Rods which have often been used for hinges for the links have frequently been distorted by the weight of the grille to thereby prevent a free hinging action. Such grilles have often required an excessive amount of material and in addition have been difficult to assemble.

In general, it is an object of the present invention to provide a rolling grille which has a smooth rolling action and which is easy to operate.

Another object of the invention is to provide a rolling grille of the above character in which the intermediate and end links can be readily assembled.

Another object of the invention is to provide a rolling grille of the above character in which the horizontal rods can be readily passed through the intermediate links and secured to the end links.

Additional objects and features of the invention will appear from the following description in which the preferred embodiments have been set forth in detail in conjunction with the accompanying drawing.

Referring to the drawing.

Figure 1:
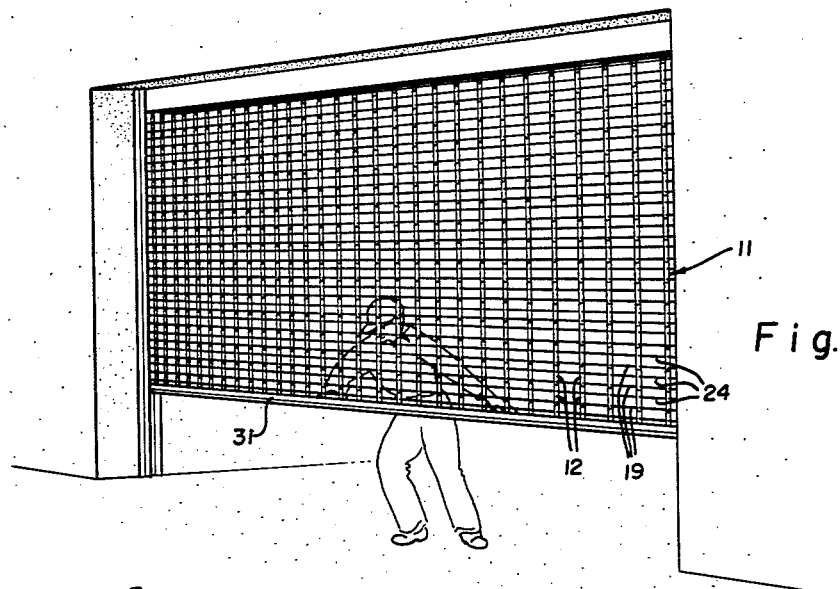
Figure 1 is an isometric view of a rolling grille embodying the present invention.
Figure 2:
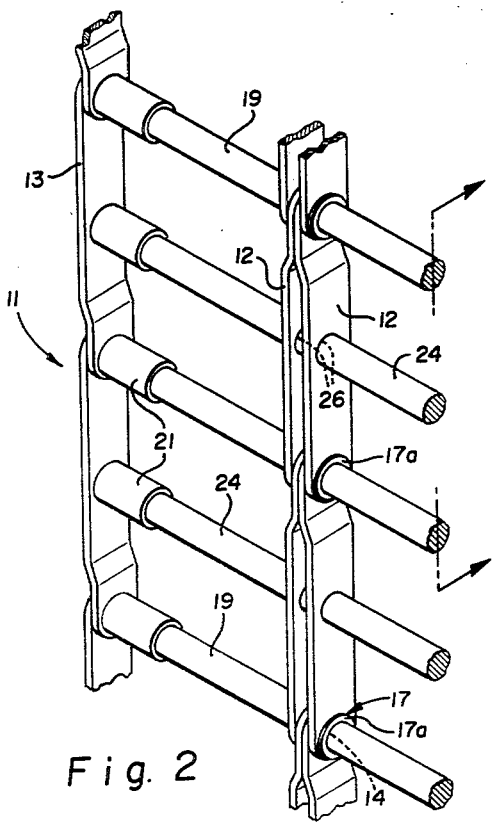
Figure 2 is an enlarged isometric view showing a portion of the rolling grille.
Figure 3:
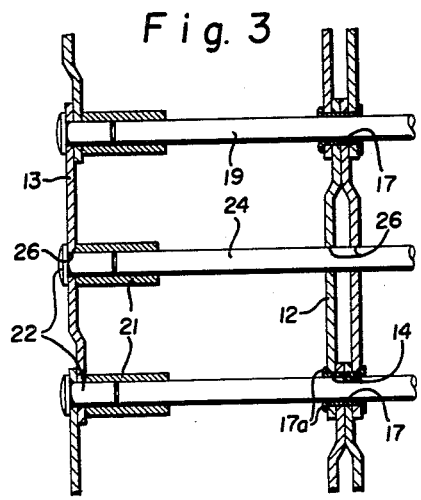
Figure 3 is a cross sectional view taken along the line 3—3 of Figure 2.

In general, the present invention consists of a plurality of vertical links which are pivotally interconnected by grommets. Horizontal rods extend through the grommets and have their ends mounted in collars which are secured to end links by pins which rotatably carry the end links and are also mounted in the collars.

As shown in the drawing, the grille 11 consists of a plurality of intermediate vertical links 12 which are arranged in pairs and end links 13. Each of the links 12 and 13 is provided with a hole 14 at each end which extends in a direction at right angles to the plane of the link. One end of each of the links 12 and 13 is offset with respect to the remainder of the links so that when the links are interconnected the links will be in line. However, as is readily apparent, the links may be straight, if desired, and mounted so that every other link is in line.

As shown in the drawing, the offset ends of the intermediate links are placed face to face and are mounted between the ends of two adjacent links so that the openings are in alignment. The links are pivotally connected by grommets 17 which are cylindrical in shape and which are provided with end flanges 17a that engage the links and prevent them from slipping off of the grommet. Thus the grommets, in addition to connecting the intermediate links, also serve to permit pivotal movement of the links on the cylindrical portions of the grommets. As shown, particularly in Figure 1, the intermediate links are equally spaced to give a pleasing effect. Horizontal rods 19 are rotatably carried by the grommets 17 and have their ends mounted in collars 21 by suitable means such as a press fit.

The end links shown are only single links and are pivotally connected together by pins 22 which are also mounted in collars 21 by suitable means such as a press fit. The pins 22 are not pressed into the collars so far that they bind or prevent pivotal movement of the end links 13.

If desired, additional horizontal rods may be mounted in the intermediate and end links as shown in the drawing. When such additional rods 24 are utilized, a hole 26 is provided in each of the links 12 and 13 intermediate the ends thereof. The holes rotatably accommodate the additional rods 24. The ends of the rods 24 are secured to the intermediate portions of the end links 13 in a manner similar to that hereinbefore described for the rods 19 which consists of the collars 21 and the pins 22.

Figure 4:
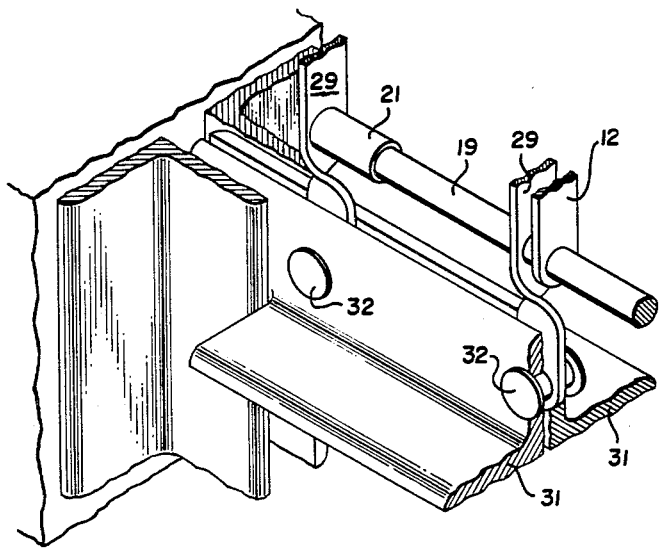
Figure 4 is an enlarged isometric view showing the footpiece of the rolling grille.
Figure 5:
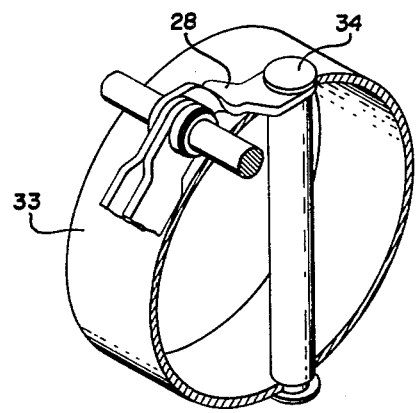
Figure 5 is an enlarged isometric view showing the manner of attachment of the rolling grille to the barrel.

Proper spacing is maintained between the intermediate links by any suitable means. For example, as shown in Figures 4 and 5, the ends of the upper and lower links are twisted through 90°. The lower links 29 are then secured to the footpiece for the grille between a pair of angles 31 by suitable means such as rivets 32. The upper links 28 are secured to a barrel 33 of the type well known to those skilled in the art by pins 34. By properly securing the upper and lower ends of the intermediate links to the angles 31 and the barrel 33, it is apparent that proper spacing will be maintained between the intermediate links throughout the length of the rolling grille. Since the intermediate links are secured together by grommets 17, they cannot shift horizontally with respect to each other.

Operation of our rolling grille may now be briefly described as follows: The grommets permit relatively free pivotal movement of the links on the grommets. No distortion can occur in the grommets which will inhibit this free pivotal movement. The end pins are properly spaced in the collars to also permit easy pivotal movement of the end links with respect to each other. These moving connections make possible a smooth rolling action on to and off of the barrel 33. It is readily apparent that this serves to increase the ease of operation while at the same time reducing wear. The construction of the ends of the grille is particularly advantageous in that the ends of the grille have a particularly attractive appearance and when once assembled are not readily disassembled.

Figure 6:
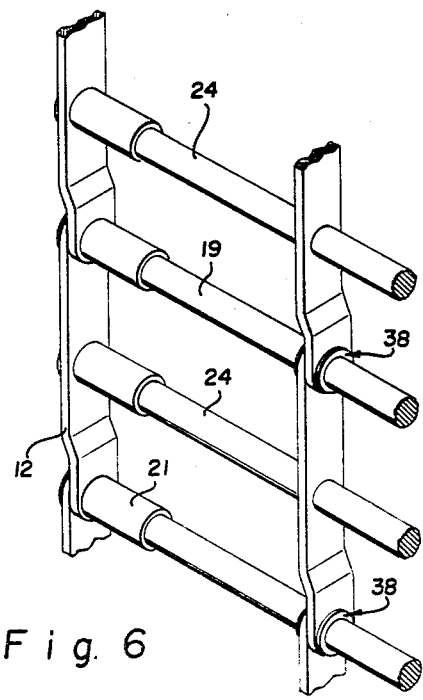
Figure 6 is an isometric view showing another embodiment of the invention.

Another embodiment of our invention is shown in Figure 6. As shown therein, only single links are utilized instead of pairs of links for the intermediate links. The links are pivotally interconnected by grommets 38 which accommodate the rods 19 and 24.

It is apparent from the foregoing that we have provided an improved rolling grille which can be readily assembled from a minimum amount of material.

We claim:

In a grille, a plurality of flat links of substantially identical size and shape, each of said links having a hole in each end thereof with its axis at right angles to the plane of the link, one end of each of the links being offset from the remainder of the link a distance equal to the thickness of the link with the remainder of the link being substantially straight, certain of said links being arranged in pairs with their offset ends in face-to-face engagement and the remainders thereof spaced apart in parallel relation, the pairs of links being arranged end to end in rows, the engaging ends of each pair being positioned between the spaced ends of the next pair in one direction and the spaced ends of each pair being positioned over the engaging ends of the next pair of links in the opposite direction, the holes in the adjacent ends of said pairs of links being in alignment, grommets mounted in the holes and pivotally connecting the pairs of links to permit relative pivotal movement thereof, a plurality of horizontal rods disposed loosely in said grommets and rotatably accommodated therein, the remainder of said plurality of links being arranged as end links, with their ends overlapped a plurality of hollow cylindrical collars of an inner diameter to receive the ends of said rods, and pins of the same diameter as said rods mounted in the holes of said overlapped ends of said end links and tightly engaged in the outer ends of said collars and connecting the end links to permit pivotal movement of the links on the pins, the ends of said rods also being tightly engaged in the inner ends of said collars in alignment with said pins.

References Cited in the file of this patent

UNITED STATES PATENTS

| | | |
|---|---|---|
| 2,095,690 | Brunst | Oct. 12, 1937 |
| 2,635,307 | Wood | Apr. 21, 1953 |

FOREIGN PATENTS

| | | |
|---|---|---|
| 543,191 | Germany | Feb. 2, 1932 |